(12) United States Patent
Monga et al.

(10) Patent No.: US 8,072,648 B2
(45) Date of Patent: Dec. 6, 2011

(54) HALFTONE INDEPENDENT CORRECTION OF SPATIAL NON-UNIFORMITIES

(75) Inventors: Vishal Monga, Webster, NY (US); Shen-Ge Wang, Fairport, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1166 days.

(21) Appl. No.: 11/881,263

(22) Filed: Jul. 26, 2007

(65) Prior Publication Data

US 2009/0027730 A1 Jan. 29, 2009

(51) Int. Cl.
*H04N 1/401* (2006.01)
*H04N 1/405* (2006.01)
*H04N 1/407* (2006.01)
*H04N 1/50* (2006.01)
*H04N 1/52* (2006.01)
*H04N 1/60* (2006.01)
*G03F 3/10* (2006.01)

(52) U.S. Cl. ............ 358/3.06; 358/3.01; 358/3.02; 358/3.09; 358/3.1; 358/3.11; 358/3.26; 358/3.27; 358/3.3; 358/501; 358/504; 358/505; 358/518; 358/534; 358/536

(58) Field of Classification Search .......... 358/3.01, 358/3.02, 3.06, 3.09, 3.1, 3.11, 3.26, 3.27, 358/3.3, 501, 504, 505, 536, 534, 518
See application file for complete search history.

(56) References Cited

U.S. PATENT DOCUMENTS

| | | | |
|---|---|---|---|
| 5,287,418 A * | 2/1994 | Kishida .................. | 382/169 |
| 5,469,267 A | 11/1995 | Wang | |
| 5,649,073 A * | 7/1997 | Knox et al. .................... | 358/1.9 |
| 5,748,330 A | 5/1998 | Wang et al. | |
| 5,749,020 A * | 5/1998 | Mestha et al. .................. | 399/49 |
| 5,854,882 A | 12/1998 | Wang | |
| 6,266,157 B1 | 7/2001 | Fan et al. | |
| 6,345,128 B1 * | 2/2002 | Stokes .................... | 382/254 |
| 6,435,654 B1 * | 8/2002 | Wang et al. .................... | 347/43 |
| 6,697,582 B1 * | 2/2004 | Scheuer .................... | 399/49 |
| 6,704,123 B1 * | 3/2004 | Av-Shalom et al. ........ | 358/2.99 |
| 6,744,531 B1 | 6/2004 | Mestha et al. | |
| 6,965,462 B1 * | 11/2005 | Henderson et al. .......... | 358/504 |
| 7,095,531 B2 * | 8/2006 | Mizes et al. .................. | 358/1.9 |
| 7,110,142 B2 * | 9/2006 | Mestha et al. ................ | 358/1.9 |

(Continued)

OTHER PUBLICATIONS

Sharma, *Digital Color Imaging Handbook*, CRC Press, 2003, Chapter 5, pp. 269-379, Chapter 6, pp. 385-487; ISBN: 0-8493-0900-X.

(Continued)

*Primary Examiner* — King Poon
*Assistant Examiner* — Beniyam Menberu
(74) *Attorney, Agent, or Firm* — Fay Sharpe LLP

(57) ABSTRACT

The predicted tone response curve for each color channel and halftone is predicted using a binary printer model and stored, wherein the "predicted tone response curve" provides a model based approximation of the actual response for the printer for each addressable pixel location in the spatial range. Also stored is an "average predicted tone response" by averaging the "predicted tone response curve" over the spatial range of the printer. With the "true average" tone response curve, the "predicted tone response curve", and the "average predicted tone response curve", an estimate of the true tone response curve for the color channel can then be mathematically obtained, wherein the true tone response curve defines a predicted actual response for the printer for each addressable print location in the spatial range. The "predicted" and "average" tone response curves are obtained using the 2×2 binary printer model.

14 Claims, 14 Drawing Sheets

U.S. PATENT DOCUMENTS

| | | | |
|---|---|---|---|
| 7,830,554 B2 * | 11/2010 | Metcalfe et al. | 358/3.21 |
| 2004/0136013 A1 * | 7/2004 | Mestha et al. | 358/1.9 |
| 2004/0150858 A1 * | 8/2004 | Cholewo et al. | 358/3.06 |
| 2004/0165199 A1 * | 8/2004 | Klassen et al. | 358/1.9 |
| 2006/0077489 A1 * | 4/2006 | Zhang et al. | 358/504 |
| 2006/0285134 A1 * | 12/2006 | Viturro et al. | 358/1.9 |
| 2007/0147695 A1 * | 6/2007 | Schweid | 382/254 |
| 2007/0177231 A1 * | 8/2007 | Wang et al. | 358/504 |

OTHER PUBLICATIONS

Wang, Shen-ge, *Two-by-Two Centering Printer Model with Yule-Nielsen Equation*, IS&T's NIP 14, International Conference on Digital Printing Technologies, Oct. 1998; p. 302-305; ISBN / ISSN: 0-89208-212-7.

* cited by examiner

HALFTONE INDEPENDENT CORRECTION OF SPATIAL NON-UNIFORMITIES

BACKGROUND

Spatial non-uniformity in digitally printed images is a commonly observed phenomenon exhibited by almost all printers. As illustrated in FIG. 1, for a given color channel digital input level to the printer, the printed color at first and second horizontal locations x1, x2 is not the same, and/or the printed color at first and second vertical locations y1, y2 is not the same. This color non-uniformity or "color drift" as a function of space on the paper or other recording medium often appears as serious image quality defects. These defects include, e.g., one-dimensional defects such as banding or streaks or two-dimensional defects such as mottle. It has been observed that the appearance of most non-uniformity defects depends on image content and color and intensity levels. Because the rendered color is a function of the halftoning method employed, spatial non-uniformity is also halftone dependent. Additionally, many high-end printers are equipped with multiple halftone screens which necessitates that any halftone dependent spatial correction method be repeated for each halftoning method.

To maintain consistent color reproduction, it is necessary to characterize the non-uniformity of each printer device so that corresponding color adjustments can be applied at the time of printing to compensate. Previous methods require printing and measuring test patches that are halftone dependent, which requires that patches be printed and measured for each available halftone method. For a xerographic engine equipped with multiple halftone screens, this method can be very time consuming to characterize each color channel for each halftone screen, as these measurements increase linearly with the number of halftone screens. Often, the design of printed test patches also varies depending upon the halftone screen, which leads to still more complexity. As such, it has been deemed desirable to develop a halftone independent apparatus and method for correction of spatial non-uniformities.

Co-pending U.S. patent application Ser. No. 11/343,656 filed Jan. 31, 2006 assigned to Xerox Corporation and entitled "Halftone Independent Color Drift Correction" is hereby expressly incorporated by reference into this specification. This prior application discloses one or more halftone independent methods and apparatus for compensating for temporal or media color drift in a printer. In particular, a first true tone response curve (TRC) for a color channel is determined when the printer is in a first state (first time or first media). A first predicted tone response curve for the color channel is also determined when the printer is in the first state. A second predicted tone response curve for the color channel is determined when the printer is in a second, color-drifted state relative to the first state, i.e., at a later time or using a different paper or other recording medium. A second true tone response curve for the color channel is then mathematically estimated using the first true tone response curve, the first predicted tone response curve, and the second predicted tone response curve. The first and second predicted tone response curves are generated using a 2×2 printer model as disclosed below.

The use of the 2×2 printer model provides a reliable and efficient proxy for full color characterization such as described, e.g., in S. Wang, K. Knox and C. Hains, "Digital Color Halftones" Digital Color Handbook, Chapter 6, CRC Press. Full color characterization is a time consuming operation that is preferably avoided in most xerographic printing environments. Simpler color correction methods based on 1-dimensional (1-D) TRC calibration for each of the individual color channels are usually sufficient and are easier to implement. The 1-D TRC calibration approach is also well-suited for use of in-line color measurement sensors, but is typically halftone dependent. In general, for each color channel C and for each halftone method H, a series of test patches are printed in response to N different digital input levels which requires C×H×N test patches, because the test patches must be printed for each halftone method. It has been found in practice that N must not be too small (e.g., N=16 is usually too small) because the TRC for each halftone method is typically not a smooth curve, due to dot overlapping and other microscopic geometries of the printer physical output. Existing methods for 1-D calibration, being halftone dependent, are measurement-intensive, and are not practical for in-line calibration, especially in print engines equipped with multiple halftone screens.

Previously, Wang and others have proposed a halftone independent printer model for calibrating black-and-white and color printers. This halftone independent printer model is referred to as the two-by-two (2×2) printer model and is described, e.g., in the following U.S. Patents, all of which are hereby expressly incorporated by reference into this specification: U.S. Pat. Nos. 5,469,267; 5,748,330; 5,854,882; 6,266,157 and 6,435,654. The 2×2 printer model is also described in the following document that is also hereby expressly incorporated by reference into this specification: S. Wang, "Two-by-Two Centering Printer Model with Yule-Nielsen Equation," Proc. IS&T NIP14, 1998.

The monochrome 2×2 printer model is explained briefly with reference to FIGS. 2A, 2B and 2C (note that in FIGS. 2A, 2B, 2C the grid pattern is shown for reference only). FIG. 2A illustrates an example of an ideal halftone printer output pattern IHP (which can represent, e.g., a single pixel P of an image), where none of the solid color ink/toner dots ID overlap each other (any halftone pattern can be used and the one shown is a single example only); practical printers are incapable of generating non-overlapping square dots as shown in FIG. 2A. A more realistic dot overlap model is the circular dot model shown in FIG. 2B for the pattern HP (the halftone pattern HP of FIG. 2B corresponds to the halftone pattern IHP of FIG. 2A). These overlapping dots D in combination with optical scattering in the paper medium create many difficulties in modeling a black-and-white printer (or a monochromatic channel of a color printer). The dots ID, D are shown by shaded regions to comply with Patent Office drawing rules, but those of ordinary skill in the art will recognize that the dots ID, D are solid color (black or other color) regions.

In a conventional approach such as shown in FIG. 2B, the location for each dot D is defined by a rectangular space L of the conceptual grid pattern G, and each location L is deemed to have a center coincident with the center of the dot D output (or not output) by the printer. Because the grid G is conceptual only, according to the 2×2 printer model, the grid G can be shifted as shown in FIG. 2C as indicated at G' so that the printer output dots D of the pattern HP are then centered at a cross-point of the grid G' rather than in the spaces (the spaces are labeled L' in the shifted grid G'). Although the halftone dot pattern HP for FIGS. 2B and 2C is identical, overlapping details within each of the rectangular spaces L' of the grid G' of FIG. 2C are completely different as compared to the spaces L of the grid G of FIG. 2B. More particularly, there are only $2^4=16$ possible different overlapping dot patterns for the 2×2 model shown in FIG. 2C, while there are $2^9=512$ different overlapping dot patterns in a conventional circular dot model as shown in FIG. 2B.

The 16 possible different overlapping dot patterns of FIG. 2C can be grouped into seven categories G0-G6 as shown in FIG. 2D, i.e., each of the 16 possible different overlapping dot patterns of a pixel location L' associated with the model of FIG. 2C can be represented by one of the seven patterns G0-G6 of FIG. 2D. The patterns G0 and G6 represent solid white and solid black (or other monochrome color), respectively. The pattern G1 is one of four different equivalent overlapping patterns that are mirror image of each other, as is the pattern G5. Each of the patterns G2, G3, G4 represents one of two different mirror-image overlapping patterns. Therefore, in terms of ink/toner color coverage (gray level), all pixels (located in the rectangular spaces L' of the conceptual grid pattern G') of each of the seven patterns G0-G6 are identical within a particular pattern G0-G6. In other words, each pattern G0-G6 consists of only one gray level and this gray level can be measured exactly.

The 2×2 printer model as just described can be used to predict the gray level of any binary (halftone) pattern, because any binary pattern such as the halftone pattern of FIG. 2C can be mathematically modeled as a combination of the seven patterns G0-G6, each of which has a measurable gray level as just described. In other words, after the seven test patches G0-G6 are printed and the gray (color) level of each is measured once, the gray level of any binary halftone pattern can be predicted mathematically and without any additional color measurements.

For example, the halftone pattern HP of FIG. 2C is shown in FIG. 3, along with its corresponding 2×2 based model M, wherein the gray level of each space L' of the grid G' is represented by one of the seven 2×2 patterns G0-G6 that has a corresponding color output pattern/coverage for its dots D'. Thus, for example, for the location $L'_{00}$ of the binary pattern HP, the 2×2 pattern G1 has dots D' with corresponding color coverage as indicated at $M'_{00}$, while for the location $L'_{50}$ of the pattern HP the 2×2 pattern G3 has dots D' with corresponding color coverage as shown at $M'_{50}$, and for the location $L'_{66}$ of halftone pattern HP there is no color (blank coverage) which corresponds to the 2×2 test patch G0 as indicated at $M'_{66}$ of the model M, etc. As such, any binary pattern of ink/toner dots can be modeled as a combination of the 2×2 patterns G0-G6 by selecting, for each dot D' of the binary pattern, the one of the 2×2 patterns G0-G6 that is defined by dots D' having color coverage in the locations L' that equals the color coverage of the corresponding halftone pattern location L'.

When a binary pattern HP is represented by a model M comprising a plurality of the patterns G0-G6, the gray level output of the binary pattern HP can be estimated mathematically, e.g., using the Neugebauer equation with the Yule-Nielsen modification, as follows:

$$G_{AVG}^{1/\gamma} = \sum_{i=0}^{6} n_i G_i^{1/\gamma}$$

where $G_i$, i=0 to 6 is the measured gray level of the respective 2×2 patterns G0-G6, $n_i$ is the number of dots of the corresponding 2×2 pattern occurring in the binary pattern, and γ is the Yule-Nielsen factor, a parameter which is often chosen to optimize the fit of the model to selected measurements of halftone patches. Details of such an optimization are given in S. Wang, K. Knox and C. Hains, "Digital Color Halftones" Digital Color Imaging Handbook, Chapter 6, CRC Press, 2003.

For example, the average gray level of the binary pattern of FIG. 2B/FIG. 2C can be estimated as:

$$G_{AVG} = (7G_0^{1/\gamma} + 25G_1^{1/\gamma} + 7G_2^{1/\gamma} + 3G_3^{1/\gamma} + 3G_4^{1/\gamma} + 3G_5^{1/\gamma} + G_6^{1/\gamma})^{\gamma}$$

The color 2×2 printer model can be described in a similar manner. The color 2×2 printer model can predict the color appearance of binary patterns for a given color printer and the color accuracy of the prediction is high for printers with relatively uniform dot shapes, such as inkjet printers. However, xerographic printers usually do not generate uniform round-shape dots for isolated single pixels and the dot overlapping is more complicated as compared to inkjet dot output. As such, the color 2×2 printer model applied to a xerographic printer will typically yield larger prediction errors.

The 2×2 test patches G0-G6 shown in FIG. 2D are theoretical. For real-world use, each of the test patches G0-G6 can be printed in a variety of different ways. The test patches G0'-G6' shown in FIG. 4 illustrate an example of one possible real-world embodiment for printing the seven patterns G0-G6, respectively. The present development is described hereinbelow with reference to printing and measuring the color of the real-world 2×2 test patches G0'-G6', and those of ordinary skill in the art will recognize that this is intended to encompass printing and measuring the color of any other test patches that respectively represent and correspond to the patterns G0-G6 in order to satisfy the 2×2 printer model as described herein. It is not intended that the present development, as disclosed below, be limited to use of the particular style of test patches G0'-G6' or any other particular embodiment of the 2×2 patterns G0-G6. In general, for the 2×2 printer model to hold, the shape of the printer output dots D' must be symmetric in the x (width) and y (height) directions, and each dot D' should be no larger than the size of two output pixel locations L' in both the x and y directions. The dots D' need not be circular as shown. It should be noted that the 2×2 test patches G0-G6 and G0'-G6' as shown in FIGS. 2D and 4, are binary in the sense that the "shaded" regions as shown in the patent drawings are "solid" color (black or other color channel) but to comply with Patent Office rules, solid black regions are not used in the patent drawings.

SUMMARY

In accordance with a first aspect of the present development, a method for compensating for spatial non-uniformities in a printer includes: generating a true average tone response curve for a color channel, wherein the true average tone response curve defines an average true response for the printer across a printed output spatial range; generating a predicted average tone response curve for the color channel, wherein the predicted average tone response curve defines an average predicted response for the printer across the spatial range; generating a predicted true tone response curve for the color channel, wherein the predicted true tone response curve defines an predicted actual response for the printer for each print location in the spatial range; generating an estimated true tone response curve for the color channel using the true average tone response curve, the predicted average tone response curve, and the predicted true tone response curve, wherein the estimated true tone response curve defines an estimated actual response for the printer as a function of each print location in the spatial range and as a function of each possible digital input color level to the printer; using the estimated true tone response curve to correct a digital color level of each pixel of an image for the color channel before printing based upon the print location of each pixel of the image and based upon the digital color level of the pixel.

In accordance with another aspect of the present development, a xerographic printing apparatus includes an image processing unit adapted to receive image data from a source, a printing unit comprising a print engine for printing the image data using a color channel to define a printed image, and a color sensor for detecting color values of the printed image printed by the print engine, the color sensor operably connected to the image processing unit to input said color values to the image processing unit. A printed output station for output of the printed image is provided. The image processing unit includes: means for determining a true average tone response curve for the color channel, wherein the true average tone response curve defines an average true response for the printer across a printed output spatial range; means for generating a predicted average tone response curve for the color channel, wherein the predicted average tone response curve defines an average predicted response for the printer across the spatial range; means for generating a predicted true tone response curve for the color channel, wherein the predicted true tone response curve defines a predicted actual response for the printer for each print location in the spatial range; and, means for generating an estimated true tone response curve for the color channel from the true average tone response curve, the predicted average tone response curve, and the predicted true tone response curve, wherein the estimated true tone response curve defines an estimated actual response for the printer for each print location in the spatial range; and means for using the estimated true tone response curve to adjust a digital input level of each pixel of an image before printing based upon the print location of each pixel of the image.

In accordance with another aspect of the present development, a method of characterizing the output response of a printer across a spatial range includes: determining a true average tone response curve for the printer across the spatial range by printing a measuring test patches across the spatial range for a plurality of digital input values; printing a plurality of halftone independent binary 2×2 test patches at each location in the spatial range and measuring the gray level of each 2×2 test patch at each location in the spatial range to obtain a measured gray level of each 2×2 test patch at each location in the spatial range; averaging the measured gray level of each 2×2 test patch across the spatial range to obtain an average gray level for each 2×2 test patch; using the measured gray level of each 2×2 test patch at each location in the spatial range in a 2×2 printer model to generate a predicted true tone response curve; using the average gray level of each 2×2 test patch in a 2×2 printer model to generate a predicted average tone response curve; generating an estimated true tone response curve describing a true response of the printer at each location in the spatial range by adjusting true average tone response curve for each location in the spatial range according to the ratio of the predicted true tone response curve to the predicted average tone response curve at said location.

In accordance with another aspect of the present development, a method for compensating for spatial non-uniformities in a printer, includes: pre-identifying a plurality of halftones for which said compensation is to be supported; pre-generating a true average tone response for each of the plurality of halftones and for each color channel, wherein the true average tone response curve defines an average across a range of spatial locations on the printed page; receiving a specific halftone from said plurality of supported halftones; printing and measuring a set of halftone-independent binary color patterns; deriving predicted true tone response curve for the halftone and for a given color channel using pre-generated true average tone response for the halftone, and measurements of halftone-independent color patterns.

BRIEF DESCRIPTION OF THE DRAWINGS

The development comprises various processes and/or structures and arrangements of same, preferred embodiments of which are illustrated in the accompanying drawings wherein.

DETAILED DESCRIPTION

Figure 1:
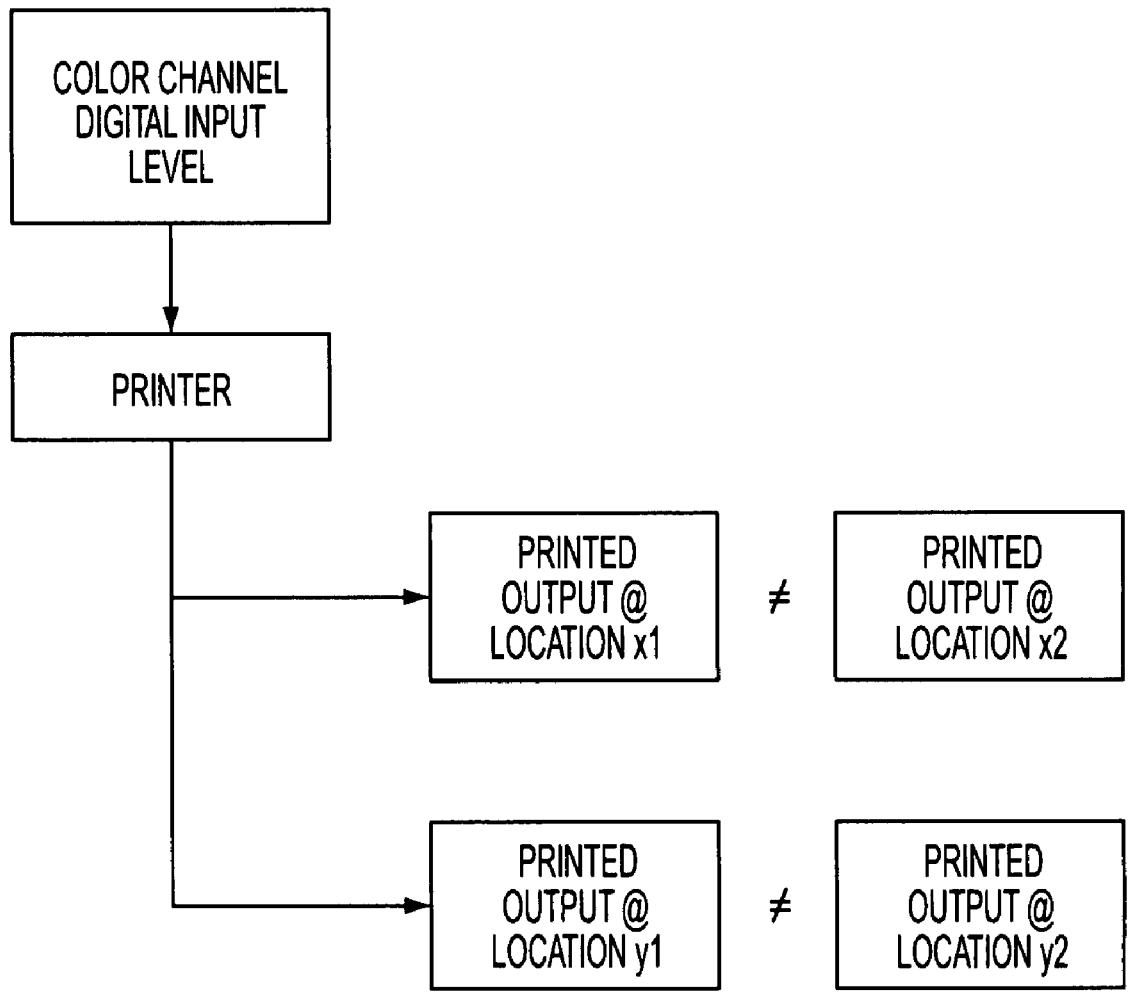
FIG. 1 diagrammatically illustrates the problem of spatial color drift for printed output.
Figure 2A:
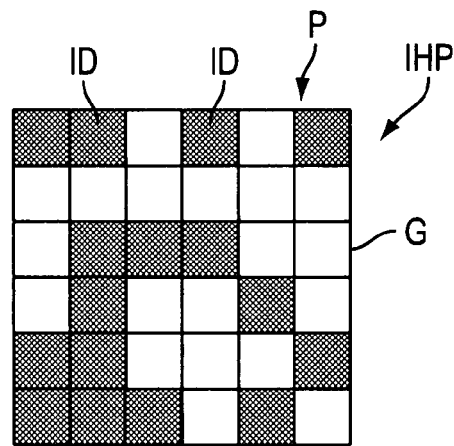
FIG. 2A illustrates an ideal non-overlapping printer model for halftone patterns.
Figure 2B:
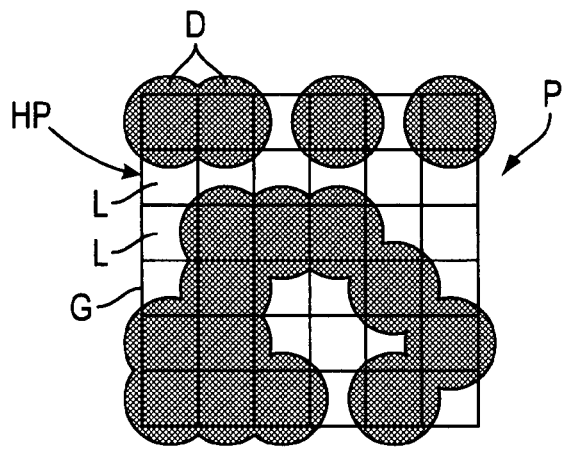
FIG. 2B corresponds to FIG. 2A but illustrates a conventional overlapping circular dot printer model for halftone patterns.
Figure 2C:
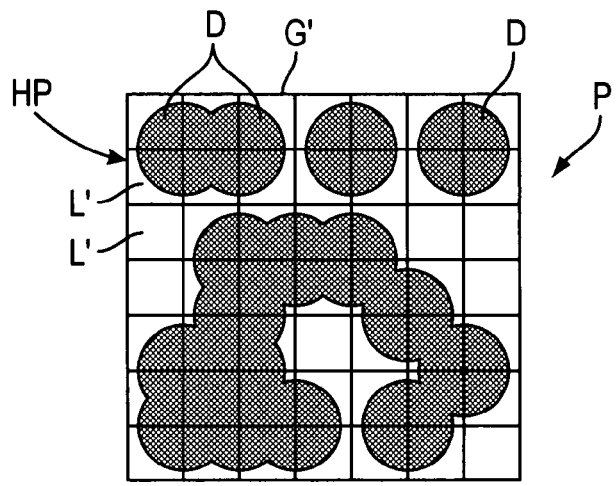
FIG. 2C corresponds to FIG. 2B but illustrates a 2×2 printer model for halftone patterns.
Figure 2D:
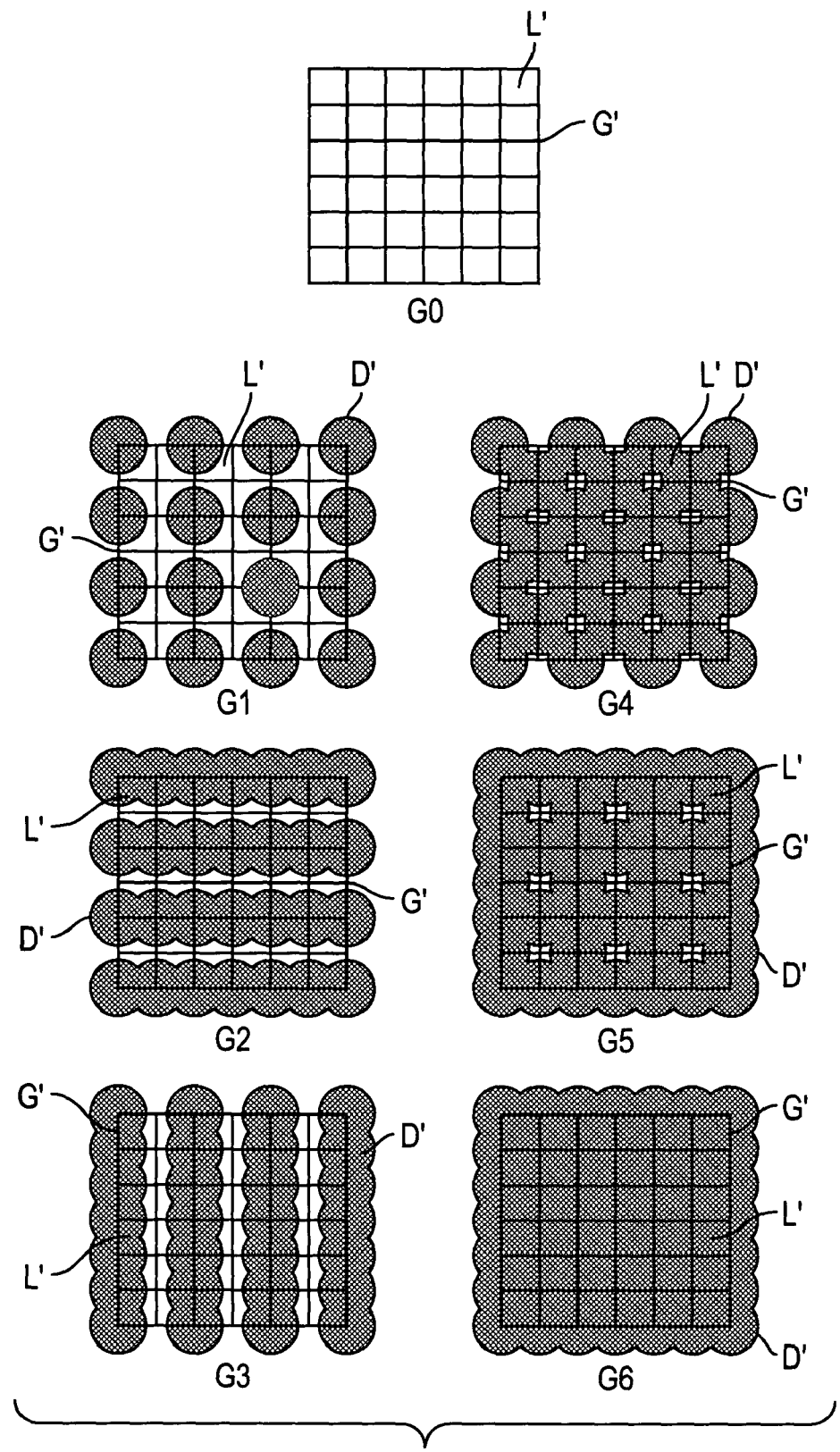
FIG. 2D illustrates seven 2×2 patterns that account for all of the 16 possible overlapping printer output dots in the 2×2 printer model.
Figure 3:
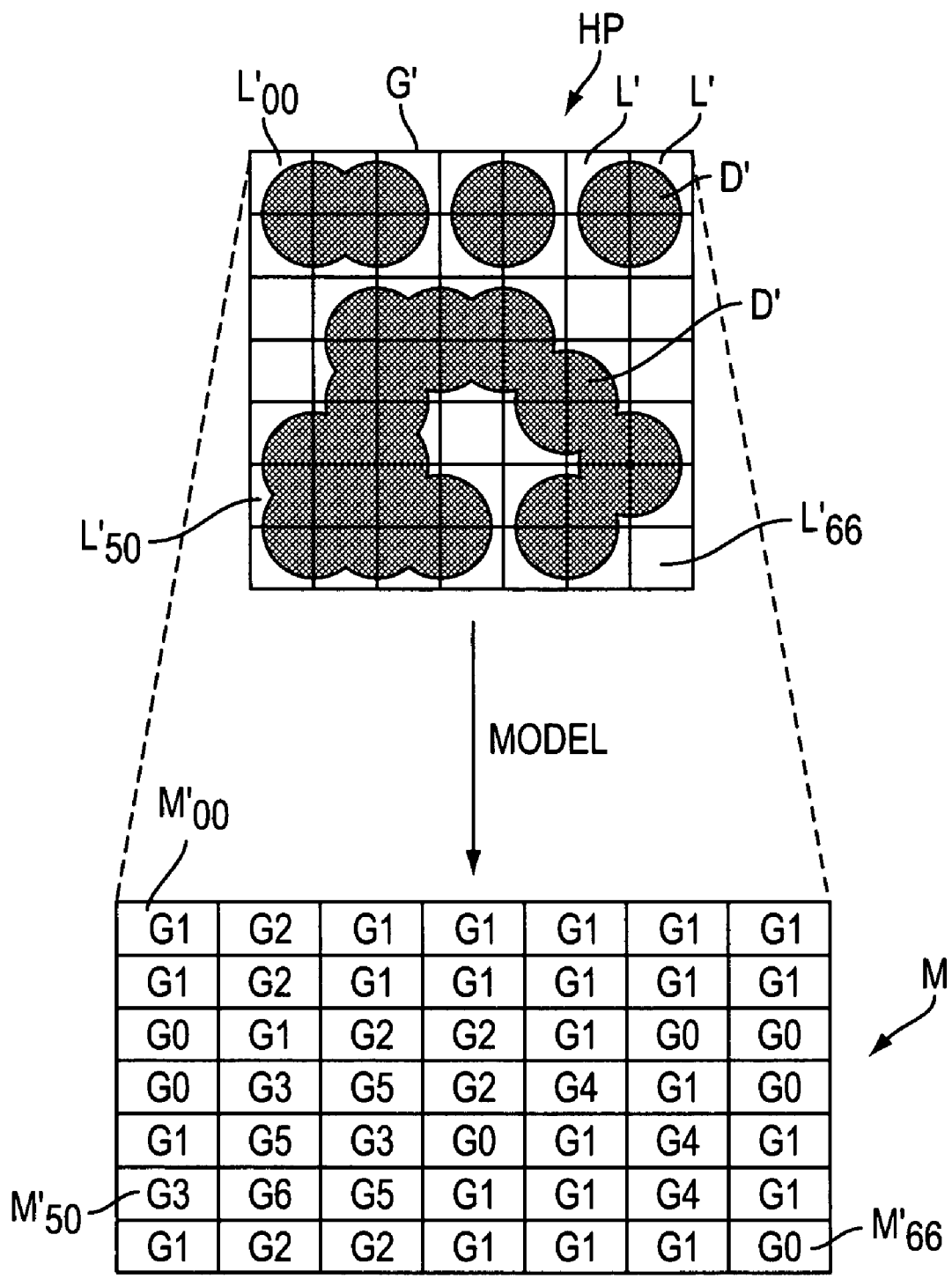
FIG. 3 illustrates an example of modeling a binary (halftone) pattern using a select plurality of the seven 2×2 patterns of FIG. 2D.
Figure 4:
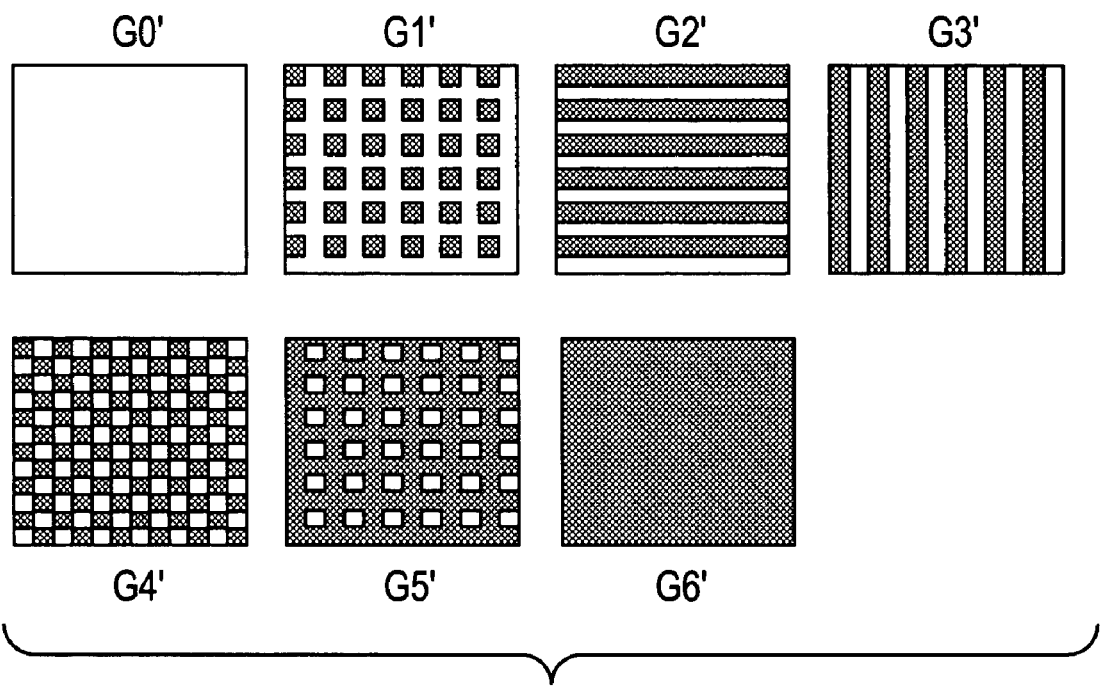
FIG. 4 illustrates one example of real-world representations or "test patches" for the seven 2×2 patterns of FIG. 2D.

In accordance with the present development, the monochrome 2×2 printer model (FIG. 3) is used to compensate for or correct spatial non-uniformities in the color of printed output. Because the 2×2 test patches are binary, i.e., not tied to any particular halftone method, this property can be exploited to provide a halftone independent color drift correction method. In accordance with the present development, the monochrome 2×2 model is used to model color output in each individual color channel of the printer.

Figure 5:
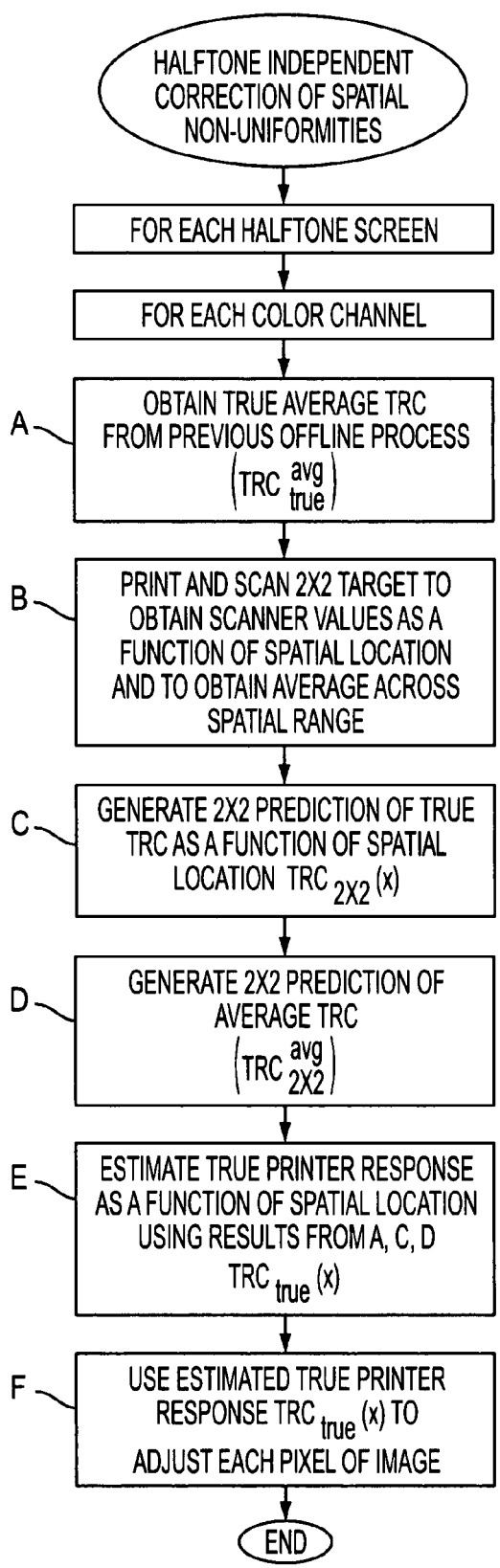
FIG. 5 is a high-level flow chart that discloses a method for halftone independent correction of spatial color non-uniformities in accordance with the present development.

FIG. 5 discloses a method for halftone independent correction of spatial non-uniformities in accordance with the present development. In general, the object is to derive an estimate of the true printer response tone reproduction curve $TRC_{true}(x)$ for each halftone screen H and for each color channel i, i.e., the printer color response as a function of every possible addressable horizontal location x on a printed page, and correspondingly as a function of every possible addressable vertical location y on a printed page, without ever having to perform a full spatial non-uniformity color characterization of the printer. To facilitate describing and understanding the present development based upon the following disclosure, the present disclosure primarily refers to the horizontal spatial locations x, but those of ordinary skill in the art will understand that the development applies equally to the vertical spatial locations y.

As shown in FIG. 5, the method is implemented for each halftone screen, and within that selection, also for each color channel. In a step A, the true average TRC ($TRC_{true}^{avg}$) is obtained from previous one-time offline process (disclosed in detail in FIG. 6). In a step B, a 2×2 target in accordance with the present development is printed and scanned to obtain scanner gray values as a function of spatial location x, which values are also then averaged across the spatial range to obtain an average 2×2 value. In a step C, the 2×2 scanner values are used to generate a 2×2 prediction of the TRC as a function of spatial location x, i.e., $TRC_{2\times2}(x)$. In a step D, the average 2×2 scanner values across the spatial range are used to generate a 2×2 prediction of the average TRC, i.e., $TRC_{2\times2}^{avg}$. The quantities obtained from steps A, C, and D are used in a step E to estimate the true printer response as a function of spatial location x, i.e., $TRC_{true}(x)$. In a step F, the estimated true printer response $TRC_{true}(x)$ for each halftone screen H and each color channel i is used to adjust the digital input level of the respective image pixels of a digital image at each pixel location x so that the printer outputs a spatially uniform rendition.

As described in more detail below, the step E of estimating the true printer response $TRC_{true}(x)$ using the quantities obtained in steps A, C, and D is accomplished by exploiting the following relationship:

$$\frac{TRC_{true}(x, i, H)}{TRC_{true}^{avg}(i, H)} = \frac{TRC_{2\times2}(x, i, H)}{TRC_{2\times2}^{avg}(i, H)}$$

where x is a particular location in the spatial range, i is a color channel, and H is a halftone screen. In other words, the relationship of the 2×2 estimated response vs. the true response of the printer can be thought of as being statistically stable or invariant with respect to spatial location. In the following disclosure we will use the terms "stable" and "invariant" in a statistical sense, rather than in a strict deterministic sense.

As noted above, the present development requires that a one-time "offline" process be performed for a printer to obtain the "true average" tone response curve $TRC_{true}^{avg}$ for the printer. This "true average" tone response curve $TRC_{true}^{avg}$ is stored for later use and is determined using any known test patch printing and measuring step using a variety of digital input color levels to print and measure color test regions or patches (sometimes referred to herein as "true average test patches") at a variety of spatial locations x across the spatial range. This step can be completed in a relatively efficient manner because only an "average" TRC across the spatial range is derived (not the "true" TRC for each location of the spatial range), so every possible digital input color level need not be used and every possible spatial location in the spatial range need not be printed and measured (keeping in mind that the object of the present development is to avoid having to perform a full characterization wherein every digital input level is used and every possible spatial location is printed and measured to obtain a the "true" TRC for the printer). In one example, for a range of digital input color values, a continuous or discontinuous band comprising the true average test patches of a digital input color value is printed across the spatial range and then measured at a plurality of different spatial locations with a scanner that is part of or separate from the printer. The scanner color measurements are averaged to determine the average printer response across the spatial range for each given digital input value. The data are interpolated to derive the true average tone response curve $TRC_{true}^{avg}$ for the subject color channel and halftone screen for all possible digital input levels. This true average tone response curve $TRC_{true}^{avg}$ (or more completely expressed as $TRC_{true}^{avg}(i, H)$) is stored for later use, in particular as input to step A of the online process shown in FIG. 5.

Figure 6:
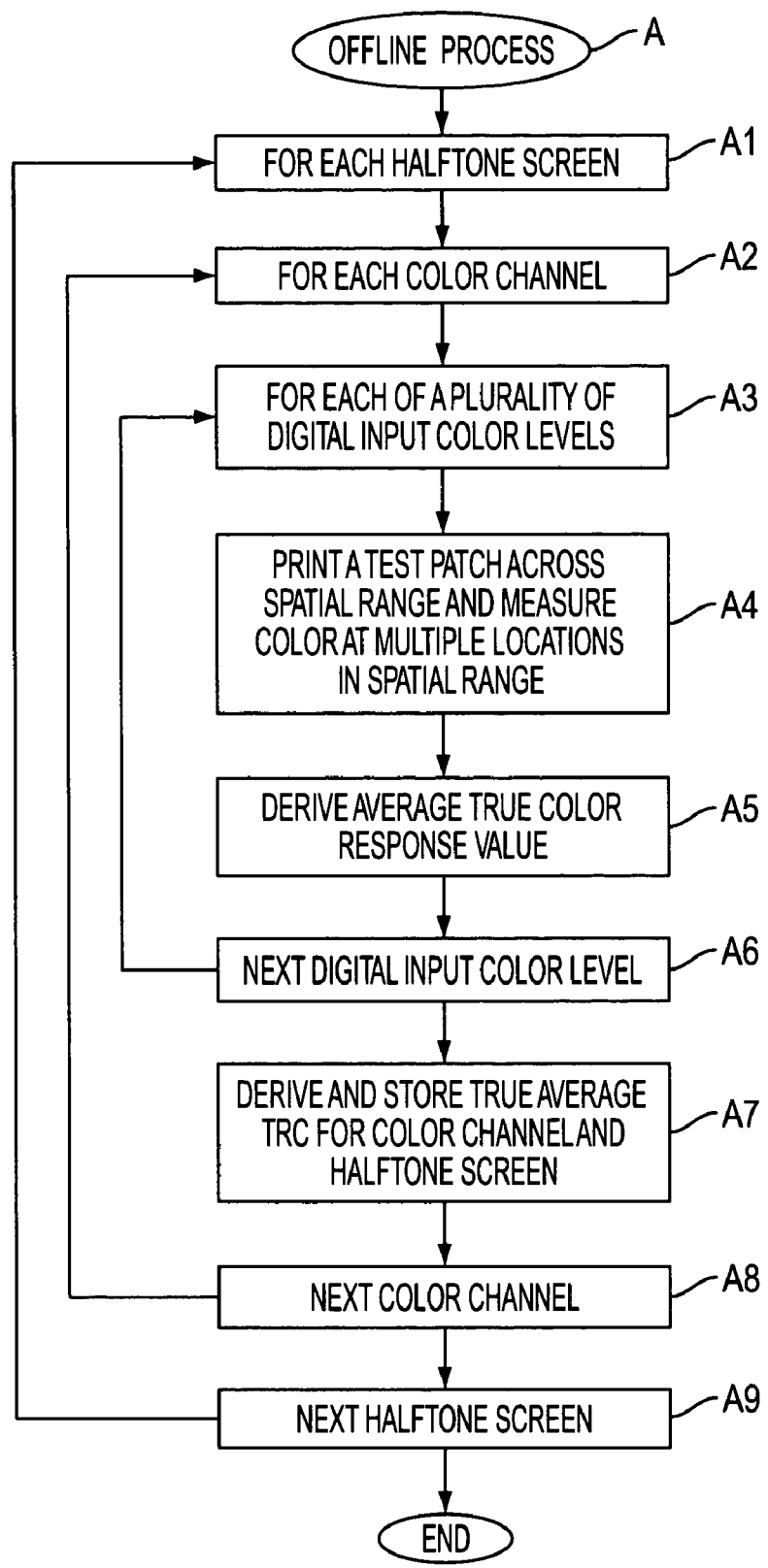
FIG. 6 discloses a one-time offline process of the method of FIG. 5.

The one-time offline process A is disclosed in more detail with reference to FIG. 6. The process is repeated for each halftone screen H (as shown at A1), and for each halftone screen the process is repeated for each color channel i (as shown at A2), e.g., cyan, magenta, yellow, black. For a plurality of different digital input color values or levels (as shown at A3) the printer prints a test patch across the spatial range of the paper (step A4), e.g., horizontally across all pixel locations. The test patch can be a continuous or discontinuous band or other configuration. As part of the step A4, a scanner or other device is used to measure the color value of the test patch at multiple locations across the spatial range. The color measurements from step A4 are used in a step A5 to derive an average color response value for the subject digital input color level. This process is repeated for a sufficient number of digital input color levels (as indicated at A6), after which a step A7 is implemented to derive an store the "true average" tone response curve $TRC_{true}^{avg}$ for a color channel under a particular halftone screen, and the process is repeated for the next color channel (as indicated at A8) and for the next halftone screen (as indicated at A9) after all color channels are completed for a given halftone screen. In one embodiment, at least 25% of all possible digital input color levels should be used in this process and be distributed evenly throughout the range of possible digital input color levels in order to obtain sufficient data to derive the true average tone response curve $TRC_{true}^{avg}$ for the printer (100% of all possible digital input color levels can be used if desired, but this greatly increases the number of test patches and measurements required). As is typically the case, if less than all possible digital input color values are used, the true average tone response curve $TRC_{true}^{avg}$ can be derived by smoothly interpolating the measured color values to fill in the missing data points.

Figure 7:
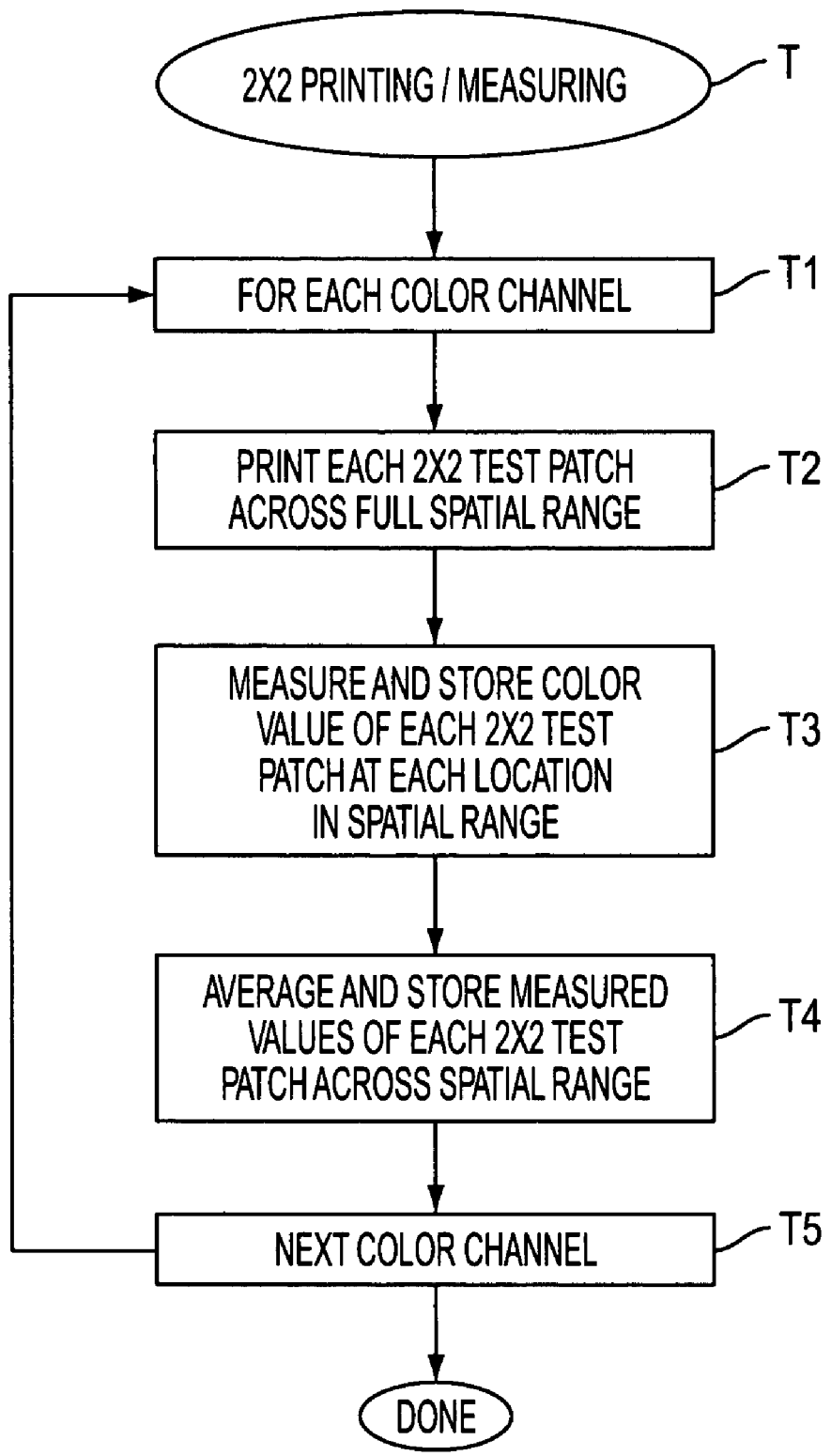
FIG. 7 discloses a 2×2 printing measuring process to obtain 2×2 data to be used in steps C and D of FIG. 5.

As noted above, the above offline process of FIG. 6 is performed only once and the resulting tone response curves $TRC_{true}^{avg}(i, H)$ are stored for later use. In contrast, the online processes of FIG. 5 are implemented each time a need to characterize the spatial color response of the printer arises, e.g., upon initial customer setup or after a repair or upgrade. As noted, these online processes require 2×2 data which is derived by printing and measuring the 2×2 test patches G0'-G6' for each color channel as disclosed in a 2×2 printing/measuring process T as set forth in FIG. 7. Referring to FIG. 7, for each color channel (as shown at T1), a step T2 is performed to print the 2×2 test patches G0'-G6' across all possible spatial locations x. In a step T3, a scanner or other device is used to measure and store the color value of each printed 2×2 test patch at every possible pixel location in the spatial range x. In a step T4, the measured color values for each the 2×2 test patch are then averaged across the spatial range, using some or preferably all of the measurements.

These processes are repeated for all color channels as indicated at T5 to obtain all required 2×2 measurements for use as described below. It should be noted that the 2×2 test patch representing no color (test patch G0' in the present application) need only be printed and measured once and not for each color channel, given that it will have the same measured color value for each color channel.

Figure 8A:
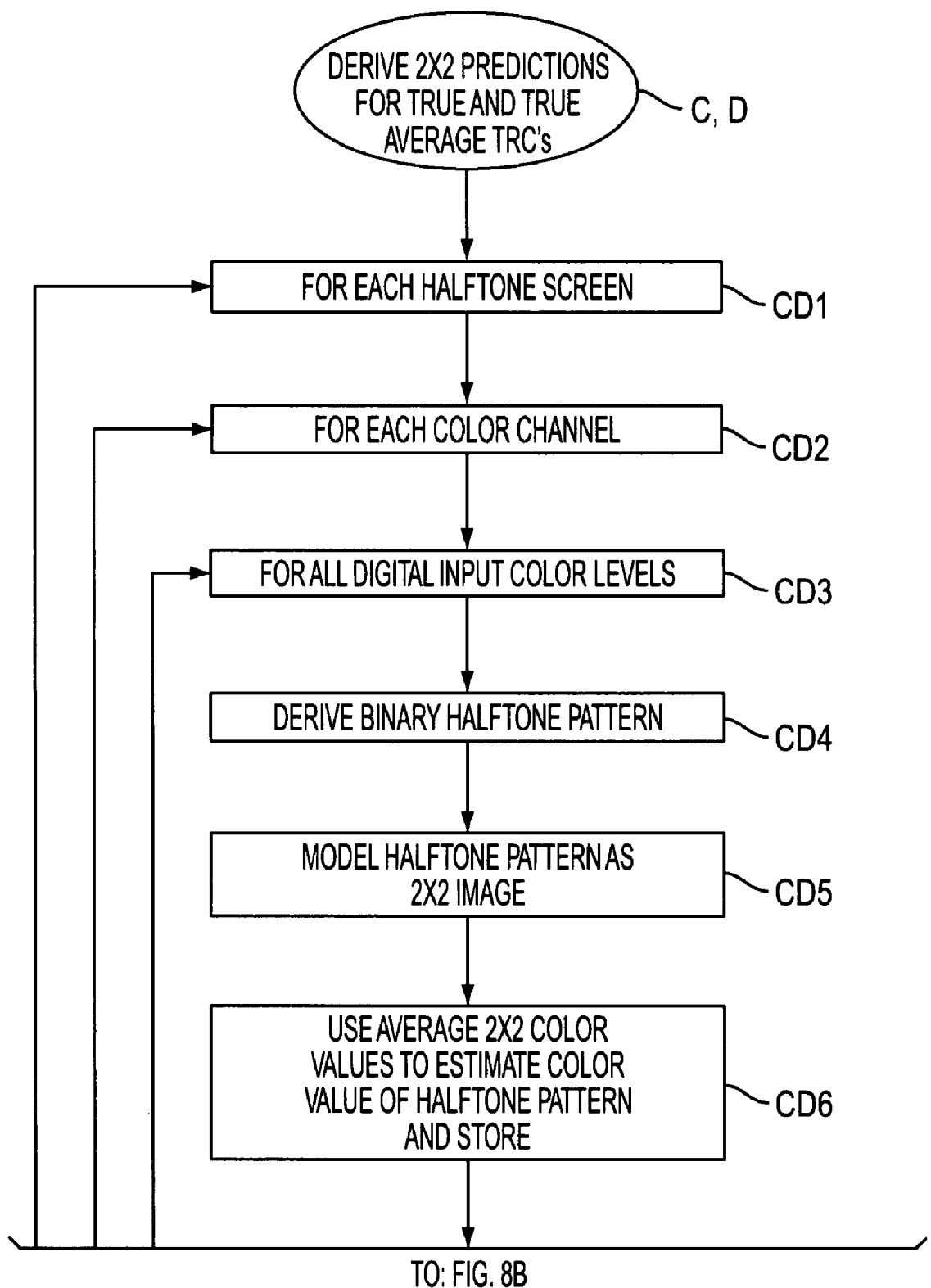
FIG. 8 (including FIGS. 8A and 8B) discloses method for deriving 2×2 predictions for a "true" and a "true average" tone response curve.
Figure 8B:
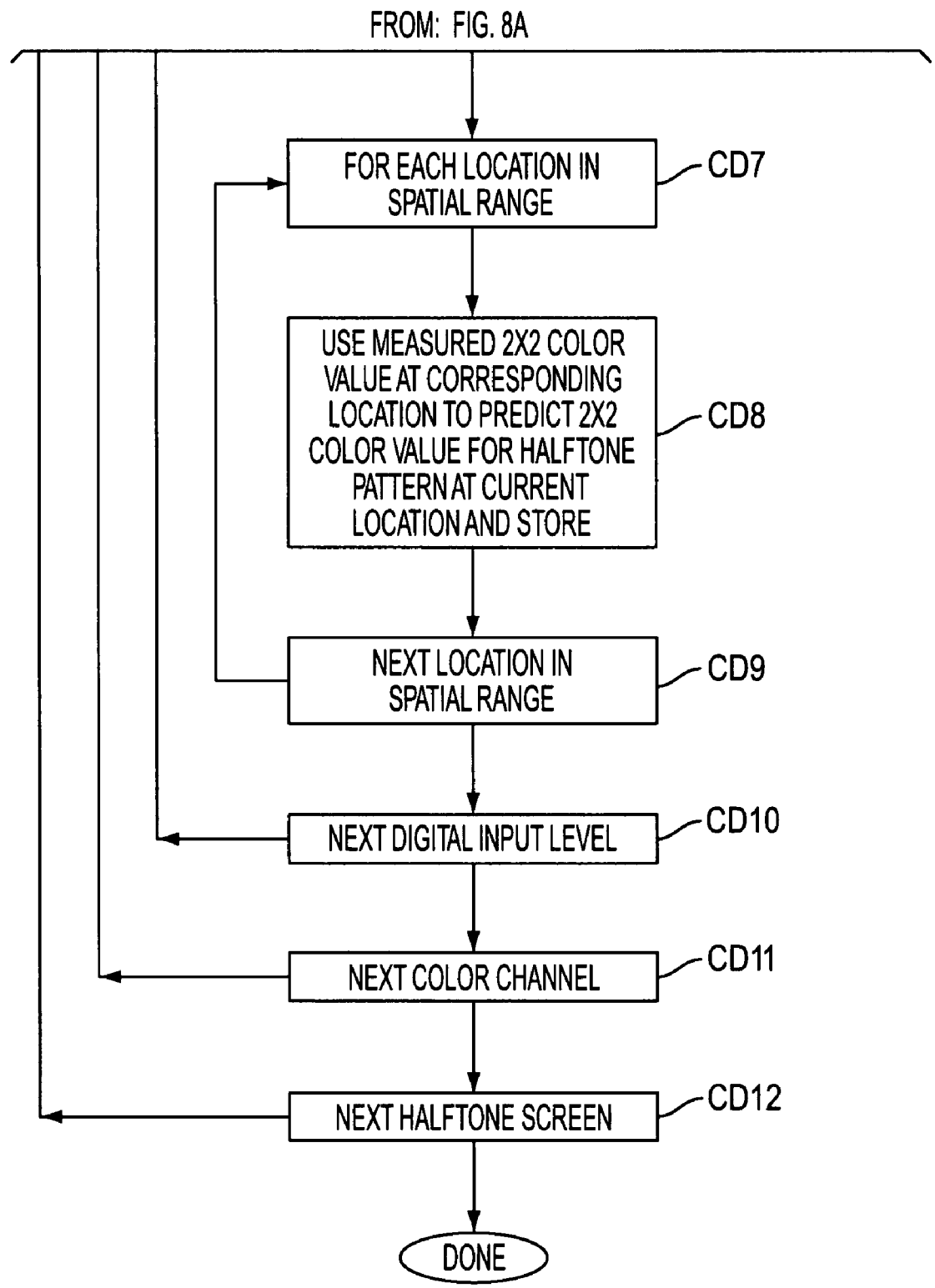

FIG. 8 (including FIG. 8A and FIG. 8B) discloses an example of the on-line processes C and D of FIG. 5, wherein the 2×2 measurement data are used to derive a 2×2 estimate of the true tone response curve $TRC_{2\times2}$ (i.e., $TRC_{2\times2}(x, i, H)$) and a 2×2 estimate of the true average tone response curve $TRC_{2\times2}^{avg}$ (i.e., $TRC_{2\times2}(i, H)$). The processes C and D are carried out for each halftone screen H of the printer (as shown at CD1), for each color channel i within each halftone screen selection (as shown at CD2), and for all possible digital input color levels within the color channel selection (as shown at CD3). A step CD4 derives the binary output pattern associated with the digital input color level and the subject halftone screen (in other words, for a given digital input level to the halftone screen algorithm, the binary printer output pattern is generated but not printed). The step CD5 mathematically models the generated binary pattern as a 2×2 image as described above with reference to FIG. 3. In a step CD6, the average of the measured 2×2 color values (obtained in step T4 above) are used in the 2×2 model to predict a 2×2 average color for the binary pattern. For each location x in the spatial range (as indicated at CD7), a step CD8 is carried out to use the corresponding 2×2 color value (the measured 2×2 color value for the same spatial location obtained in step T3 above) in the 2×2 model to predict a 2×2 color value for the binary pattern at the subject spatial location. As noted at CD9, step CD8 is repeated for each spatial location in the spatial range (e.g., for all horizontal locations x or vertical location y on the printed page), after which as noted at CD10 the process returns to CD3 for processing the next digital input color level. As indicated at CD11, after all possible digital input color levels are processed, processing returns to CD2 for the next color channel. As indicated at CD12, when all color channels are processed for a halftone screen, processing returns to CD1 to begin the process anew for the next halftone screen.

Those of ordinary skill in the art will recognize that the stored values resulting from step CD6 define the 2×2 estimate of the true average tone response curve $TRC_{2\times2}^{avg}$ (a 2×2 estimate of the average printer response across the spatial range) and that the stored values from step CD8 define the 2×2 estimate of the true tone response curve $TRC_{2\times2}(x)$ (a 2×2 estimate of the printer response at each location x in the spatial range) for each color channel i and halftone screen H.

In the online process E of FIG. 5, the desired end result of an estimated true spatial tone response curve $TRC_{true}(x, i, H)$ for the printer is derived using $TRC_{true}^{avg}(i, H)$, $TRC_{2\times2}(x, i, H)$, and $TRC_{2\times2}^{avg}(i, H)$ based upon the following relationship for a given color channel i and halftone screen H:

$$\frac{TRC_{true}(x, i, H)}{TRC_{true}^{avg}(i, H)} = \frac{TRC_{2\times2}(x, i, H)}{TRC_{2\times2}^{avg}(i, H)}$$

where x is a particular spatial pixel location in the spatial range. Solving for the desired estimated $TRC_{true}(x, i, H)$ leads to the equation:

$$TRC_{true}(x, i, H) = TRC_{true}^{avg}(i, H) \frac{TRC_{2\times2}(x, i, H)}{TRC_{2\times2}^{avg}(i, H)}$$

for each spatial location x in the spatial range.

As noted, in the online step F of FIG. 5, the estimated true TRC as a function of spatial location x $TRC_{true}(x, i, H)$ is used to generate an appropriate correction to the relevant correspondingly located image pixel data (e.g., ΔE from paper) as a function of the spatial location x (note that the correction can be 0 or no adjustment) and also based upon the particular starting digital input level for the pixel data in the corresponding location of the image to be printed. According to the present development, each pixel of the input image is adjusted as a function of its digital input level and its location x using the estimated $TRC_{true}(x, i, H)$ before printing to ensure a spatially uniform output image. It can thus be seen that the ratio $$\frac{TRC_{2\times2}(x, i, H)}{TRC_{2\times2}^{avg}(i, H)}$$

defines a halftone correction factor HCF that is applied to the true average TRC $TRC_{true}^{avg}(i, H)$ to obtain the desired end result $TRC_{true}(x, i, H)$ which provides the correction values to be applied to each digital input level as a function of location x for each color channel i and halftone screen H.

It should be noted that the above exploits the fact that:

$$\frac{TRC_{true}(x_a, i, H)}{TRC_{true}(x_b, i, H)} = \frac{TRC_{2\times2}(x_a, i, H)}{TRC_{2\times2}(x_b, i, H)} \ \forall \ a, b \in X$$

where X represents the set of all spatial locations in the spatial range. In other words, there is a spatial invariance, in a statistical sense, between the 2×2 predicted response and the true response of the printer. Equivalently this means that:

$$\frac{TRC_{true}(x, i, H)}{TRC_{2\times2}(x, i, H)} = c \ \forall \ x \in X$$

which implies:

$$\frac{TRC_{true}^{avg}(i, H)}{TRC_{2\times2}^{avg}(i, H)} = \frac{\int_x TRC_{true}(x, i, H) dx}{\int_x TRC_{2\times2}(x, i, H) dx} = c$$

Figure 9:
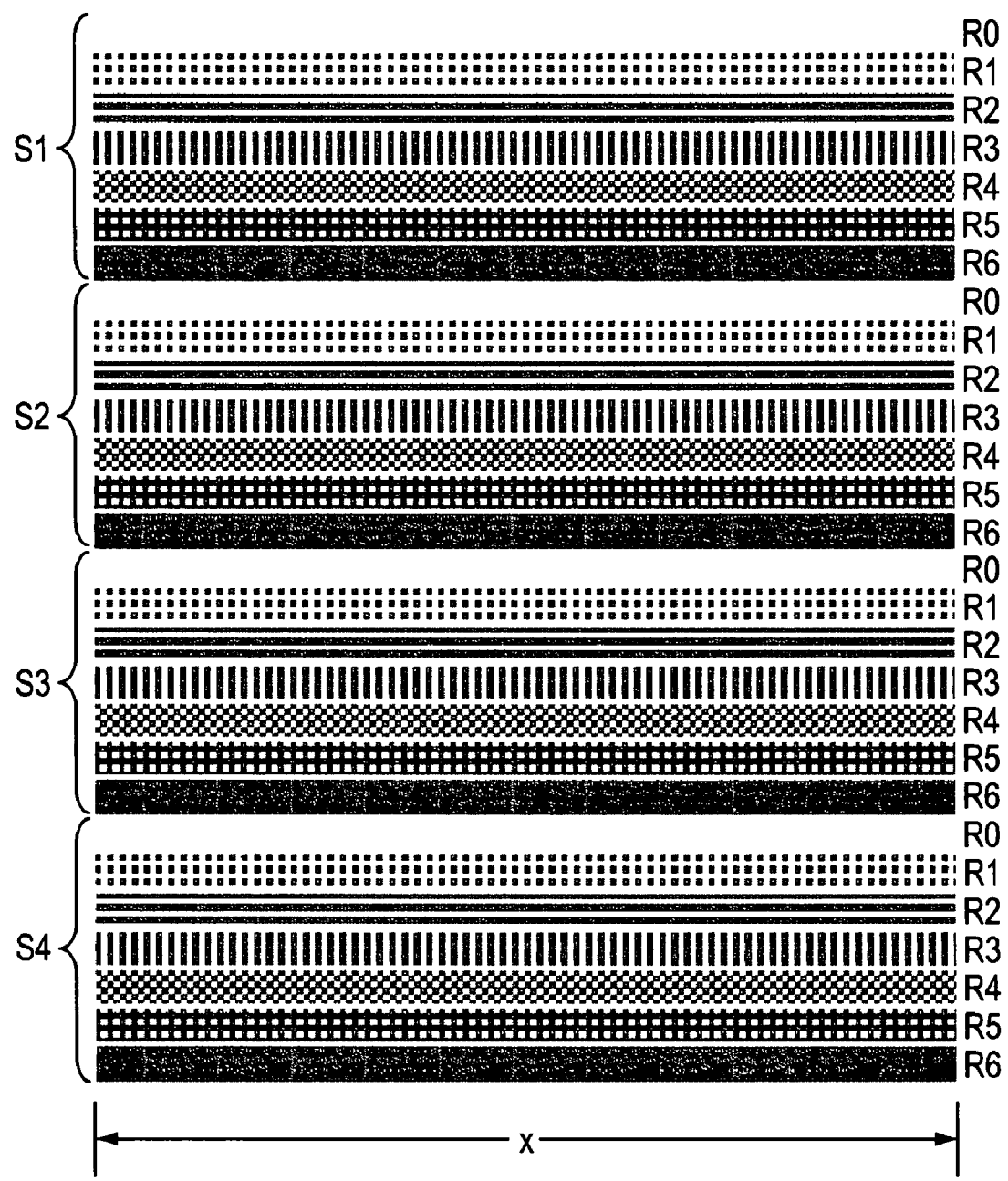
FIG. 9 shows one example of a 2×2 test pattern for used in correction of horizontal non-uniformities.

This means that the ratio of true and 2×2 responses can be replaced by a summed up or averaged ratio. In practice, averaging significantly enhances the robustness of the correction scheme because it reduces the effect of noise FIG. 9 illustrates one example of test page on which the 2×2 test patches G0'-G6' are printed. In particular, 4 sets S1,S2,S3,S4 of seven horizontal rows are repeated on the page, which the rows R0-R6 corresponding respectively to the test patches G0'-G6', i.e., each row R0-R6 is defined by one of the test patches G0'-G6' printed across the horizontal spatial range x of the page. Although only one of the sets S1-S4 is required, using the test page as shown in FIG. 8, the measured color values for each pixel location can be averaged across the sets S1-S4 to minimize the effect of noise on the printed page or measurement variations.

Figure 10:
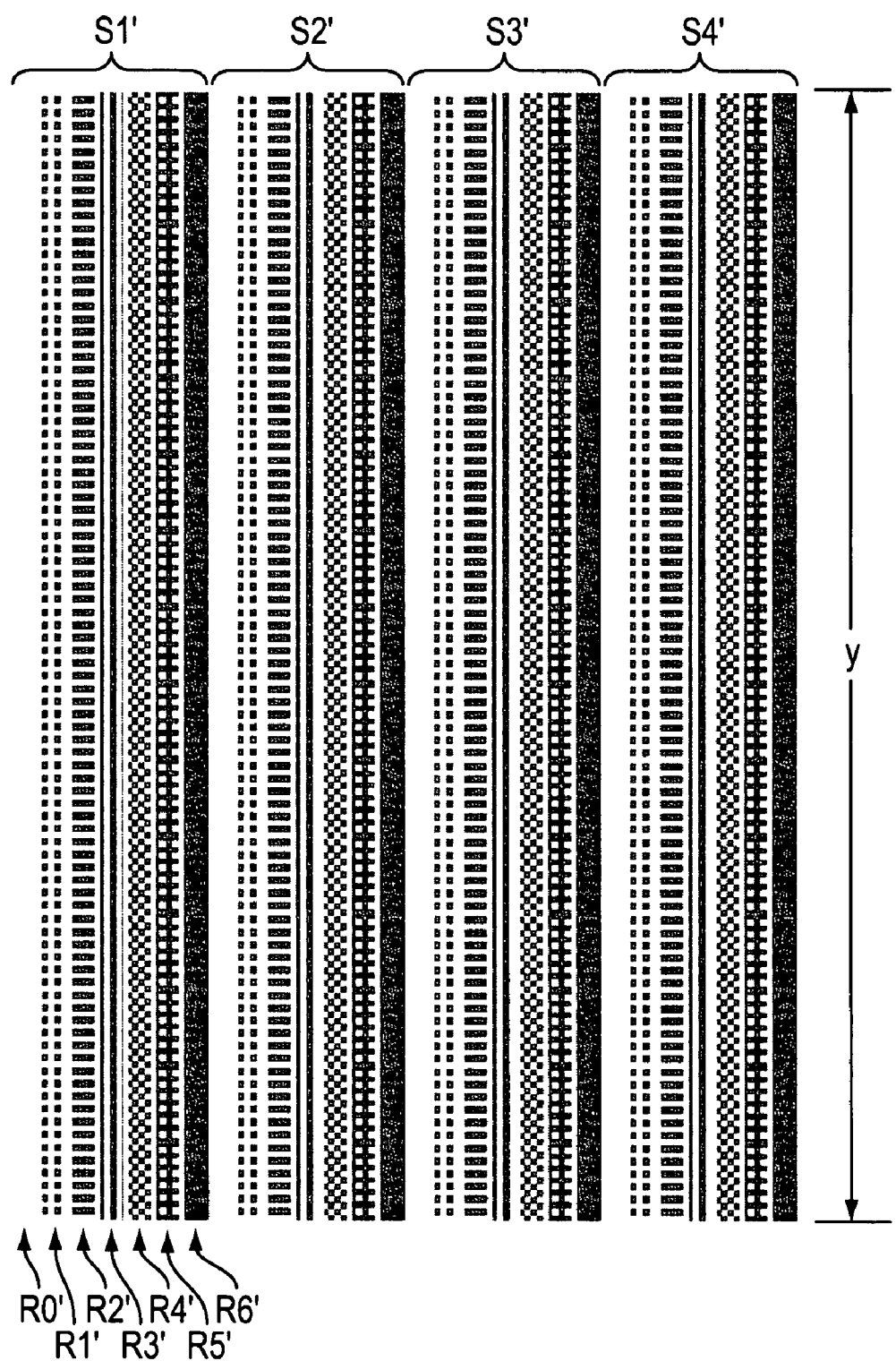
FIG. 10 shows one example of a 2×2 test pattern for used in correction of vertical non-uniformities.

If correction of vertical spatial non-uniformities is of interest, a test page such as shown in FIG. 10 can be used for printing and measuring the 2×2 test patches G0'-G6' are printed. In particular, 4 sets S1',S2',S3',S4' of seven vertical rows are repeated on the page, which the rows R0'-R6' correspondingly respectively to the test patches G0'-G6', i.e., each row R0'-R6' is defined by one of the test patches G0'-G6' printed vertically throughout for the spatial range y of the page. As noted with respect to FIG. 8, only one of the sets S1'-S4' is required, but using multiple sets S1'-S4' as shown in FIG. 9 allows for the measured color values for each pixel location to be averaged across the sets S1'-S4' to minimize the effect of noise on the printed page or measurement variations.

Figure 11:
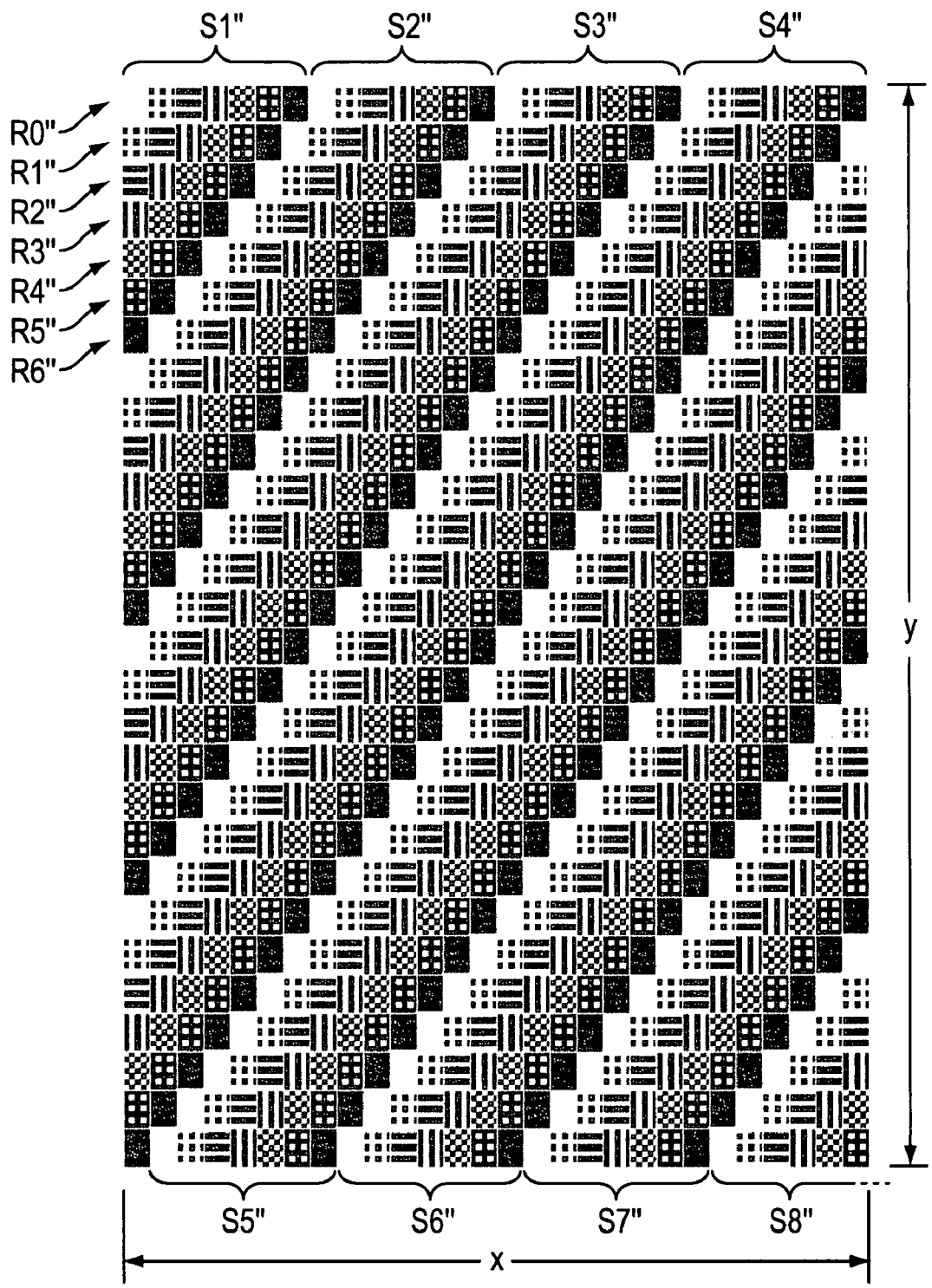
FIG. 11 shows one example of a 2×2 test pattern for used in correction of two-dimensional non-uniformities.

FIG. 11 illustrates one example of a test page on which the 2×2 test patches G0'-G6' are printed in a pattern that allows for two-dimensional spatial non-uniformity correction, i.e., correction of horizontal and vertical non-uniformities by printing and measuring a single 2×2 test page. This results in sets S1"-S8" of diagonal rows R0"-R6", wherein the rows R0"-R6" correspond respectively to and are defined by a succession of test patches G0'-G6'.

Figure 12:
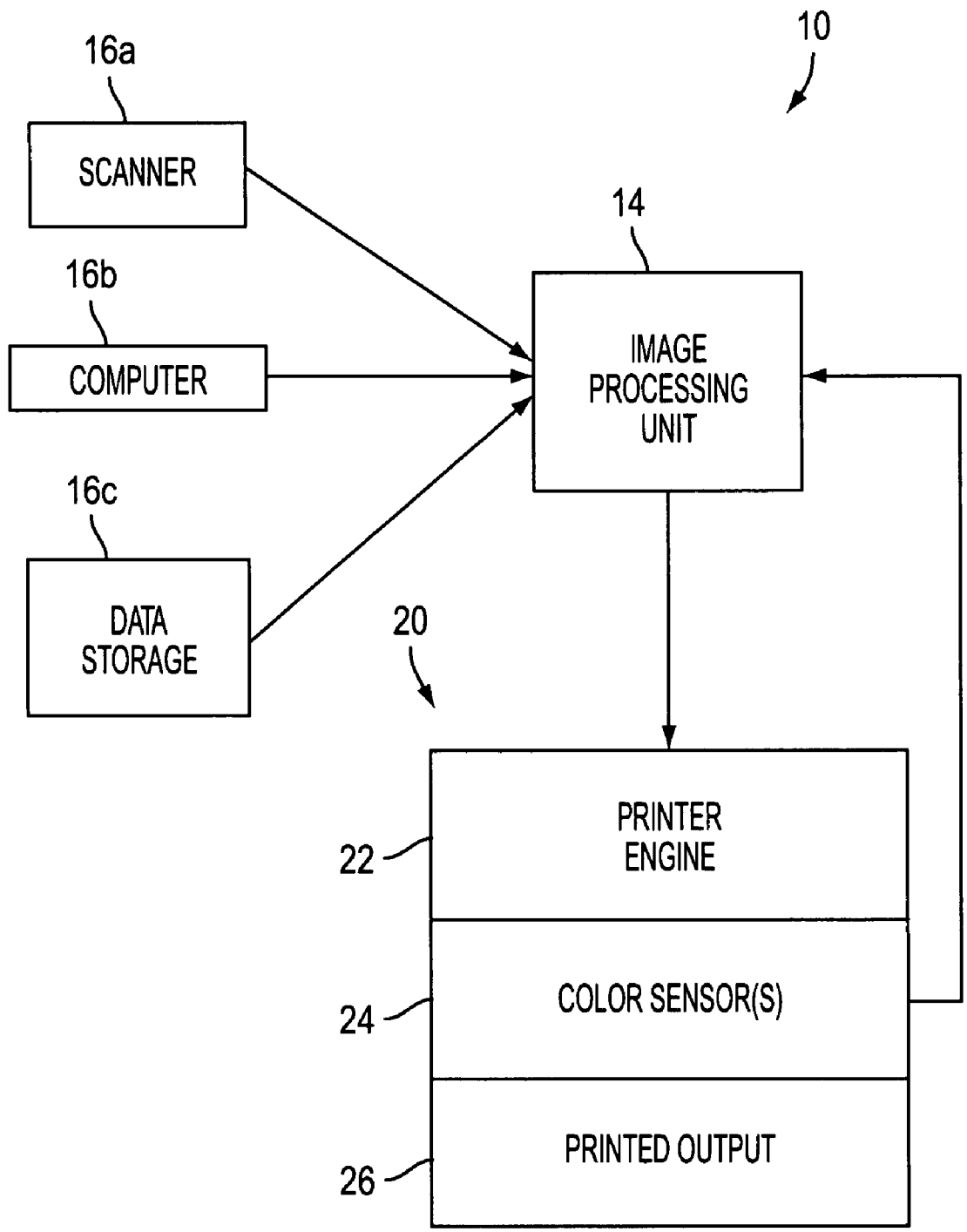
FIG. 12 illustrates one example of an apparatus for implementing a system in accordance with the present development.

The system and/or method of the present development is/are preferably implemented in a printing system such as any commercially available printer, which can be provided as part of a printing and/or reproduction apparatus. Typically, the printer is a xerographic printer although the present development is applicable to other printing methods such as inkjet. FIG. 12 illustrates one example of an apparatus that is suitable for implementing a method and apparatus in accordance with the present development. The apparatus 10 comprises an image processing unit IPU 14 for carrying out the above-described image processing operations. The IPU 14 is defined by electronic circuitry and/or software that is dedicated to image processing or can comprise a general purpose computer programmed to implement the image processing operations disclosed herein. The IPU 14 is adapted to receive image data from a source such as a scanner 16a, computer 16b, and/or data storage 16c or another source that is part of the apparatus 10 and/or that is operably connected to the IPU 14. The apparatus comprises a printing unit 20 comprising a print engine 22 for printing the image data on paper or another printing medium using ink and/or toner as is known in the art, using the CMYK or other color space. The print unit also comprises one or more in-line (i.e., located along the paper travel path) color sensors 24 provided as part of a color scanner or other device such as a colorimeter for detecting the color of the image printed by the print engine. The one or more color sensors are operably connected to the IPU 14 for providing the sensed color data to the IPU as required to implement the above described color drift correction operations. The printer unit 20 further comprises a printed output station 26 for output of the final printed product.

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications, variations, improvements, and substantial equivalents.

The invention claimed is:

1. A method for compensating for spatial non-uniformities in a printer, said method comprising:

generating a true average tone response curve for a color channel, wherein the true average tone response curve defines an average true response for the printer across a printed output spatial range;

generating a predicted average tone response curve for the color channel, wherein the predicted average tone response curve defines an average predicted response for the printer across the spatial range;

generating a predicted true tone response curve for the color channel, wherein the predicted true tone response curve defines an predicted actual response for the printer for each print location in the spatial range;

generating an estimated true tone response curve for the color channel using the true average tone response curve, the predicted average tone response curve, and the predicted true tone response curve, wherein the estimated true tone response curve defines an estimated actual response for the printer as a function of each print location in the spatial range and as a function of each possible digital input color level to the printer, wherein said estimated true tone response curve is represented by $TRC_{true}(x, i, H)$, said true average tone response curve is represented by $TRC_{true}^{avg}(i, H)$, said predicted average tone response curve is represented by $TRC_{2\times2}^{avg}(i, H)$, and said predicted true tone response curve is represented by $TRC_{2\times2}(x, i, H)$, and wherein said estimated true tone response curve is determined according to the following equation:

$$TRC_{true}(x, i, H) = TRC_{true}^{avg}(i, H) \frac{TRC_{2\times2}(x, i, H)}{TRC_{2\times2}^{avg}(i, H)}$$

where x represents said spatial location, i represents a color channel, H represents a halftone screen;

using said estimated true tone response curve to correct a digital color level of each pixel of an image for the color channel before printing based upon said print location of each pixel of said image and based upon said digital color level of the pixel;

wherein said step of generating a predicted true tone response curve for the color channel comprises:

using the printer to print a plurality of different 2×2 test patches at each location in the spatial range using said color channel and measuring a 2×2 color value of each 2×2 test patch at each location in the spatial range to obtain a measured 2×2 color value for each test patch at each location in the spatial range;

deriving a plurality of binary halftone patterns for a corresponding plurality of online digital input color values;

deriving a model for each of said plurality of binary halftone patterns, wherein said model is such that each of said binary halftone patterns is represented by a respective group of said 2×2 test patches;

for each location in the spatial range, using the measured 2×2 color values, at said location, of the 2×2 test patches included in the model to predict a color output value for each of said binary halftone patterns, wherein each predicted color output value is related to one of said plurality of online digital input color values to thereby define said predicted true tone response curve for the color channel.

2. The method as set forth in claim 1, wherein said step of determining a true average tone response curve for the color channel comprises:

for each of a plurality of offline digital input color levels, printing one or more true average test patches that encompass at least part of the spatial range and measuring a color value of the true average test patches for a plurality of different spatial locations in the spatial range and averaging the measured color values to obtain a true average output color value for each of said plurality of offline digital input color levels.

3. The method as set forth in claim 2, wherein the plurality of offline digital input color levels comprises less than all possible digital input color levels.

4. The method as set forth in claim 3, wherein said step of generating a true average tone response curve for the color channel further comprises deriving an average output color value for all other digital input color levels not included in said plurality of offline digital input color levels.

5. The method as set forth in claim 4, wherein said step of deriving an average output color value for all other digital input color levels not included in said plurality of offline digital input color levels comprises an interpolation step.

6. The method as set forth in claim 1, wherein said step of generating a predicted average tone response curve comprises averaging each of said predicted color output values across the spatial range for each of said plurality of online digital input color values to thereby define said predicted average tone response curve for the color channel.

7. The method as set forth in claim 1, wherein:
each of said binary halftone patterns is defined by a plurality of dots each exhibiting 1 of 7 possible magnitudes of color coverage for a region of the binary halftone pattern, and each 2×2 test patch corresponds to 1 of said 7 possible levels of color coverage;
said step of deriving said model comprises, for each of said plurality of binary halftone patterns, classifying each dot of the halftone pattern as exhibiting 1 of said 7 possible levels of color coverage and associating the corresponding one of said 2×2 test patches with the classified dot.

8. The method as set forth in claim 7, wherein:
the color output value for each of the plurality of binary halftone patterns is calculated according to the Neugebauer equation with the Yule-Nielsen modification, as follows:

$$G_{AVG}^{1/\gamma} = \sum_{i=0}^{6} n_i G_i^{1/\gamma}$$

where $G_i$, i=0 to 6 is the respective measured 2×2 color value of the 2×2 test patches included in the plurality of 2×2 test patches, $n_i$, is the number of the corresponding 2×2 test patches included in the model, and $\gamma$ is the Yule-Nielsen factor.

9. The method as set forth in claim 8, wherein each 2×2 test patch extends in a row or a column across the spatial range.

10. The method as set forth in claim 9, wherein each 2×2 test patch is printed in a row or column across the spatial range more than one time, and wherein said step of measuring the 2×2 color value of each 2×2 test patch at each location in the spatial range comprises measuring said 2×2 color value in each row or column and averaging the measurements for each corresponding location in the spatial range.

11. The method as set forth in claim 1, repeated for each color channel of the printer.

12. A method of characterizing the output response of a printer across a spatial range, said method comprising:
determining a true average tone response curve for the printer across the spatial range by printing and measuring test patches across the spatial range for a plurality of digital input values;
using the printer to print a plurality of halftone independent binary 2×2 test patches at each location in the spatial range and measuring the gray level of each 2×2 test patch at each location in the spatial range to obtain a measured gray level of each 2×2 test patch at each location in the spatial range;
averaging the measured gray level of each 2×2 test patch across the spatial range to obtain an average gray level for each 2×2 test patch;
using the measured gray level of each 2×2 test patch at each location in the spatial range in a 2×2 printer model to generate a predicted true tone response curve;
using the average gray level of each 2×2 test patch in a 2×2 printer model to generate a predicted average tone response curve;
generating an estimated true tone response curve describing a true response of the printer at each location in the spatial range by adjusting true average tone response curve for each location in the spatial range according to the ratio of the predicted true tone response curve to the predicted average tone response curve at said location.

13. The method of claim 12, further comprising, using said estimated true tone response curve to correct a digital level of each pixel in an image, wherein each pixel of said image is located at one of said locations in said spatial range and said digital level of each pixel is adjusted as a function of where said pixel is located in said spatial range.

14. The method of claim 13, wherein said digital level of each pixel is adjusted as a function of where said pixel is located in said spatial range and as a function of said digital level of said pixel.

* * * * *